Oct. 15, 1929.  A. POWELSKI  1,731,907
JOURNAL BEARING
Filed July 6, 1926   4 Sheets-Sheet 1

INVENTOR.
Albert Powelski
BY Warren D. House,
His ATTORNEY.

Witness:
R. E. Hamilton

Oct. 15, 1929.　　　A. POWELSKI　　　1,731,907
JOURNAL BEARING
Filed July 6, 1926　　　4 Sheets-Sheet 2

INVENTOR.
Albert Powelski
BY Warren D. House,
His ATTORNEY.

Oct. 15, 1929.  A. POWELSKI  1,731,907
JOURNAL BEARING
Filed July 6, 1926  4 Sheets-Sheet 3
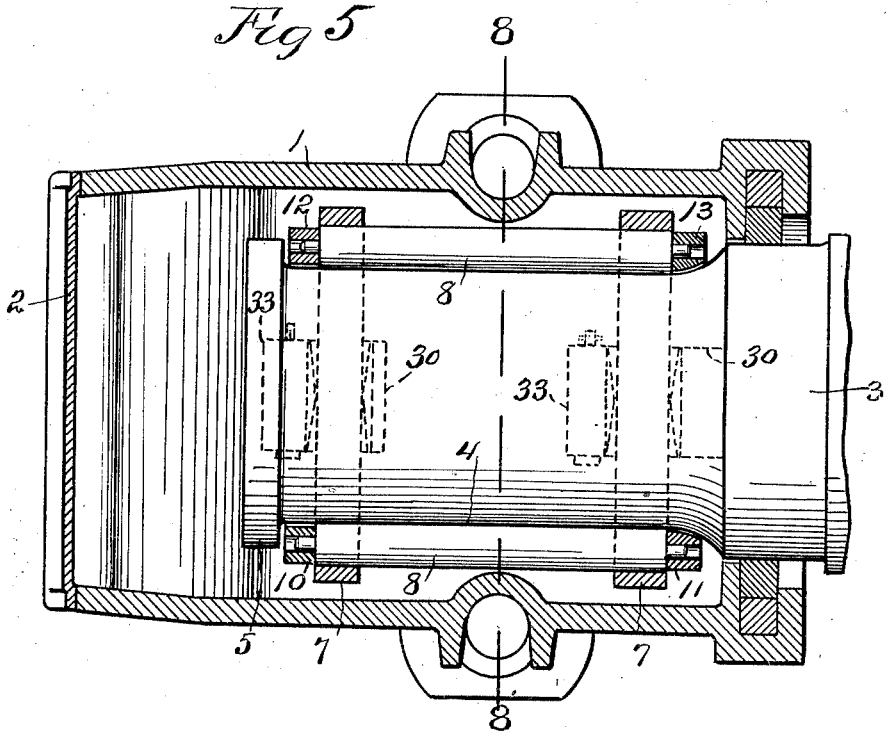
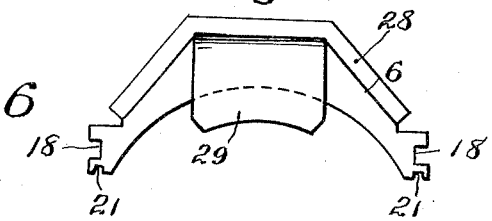
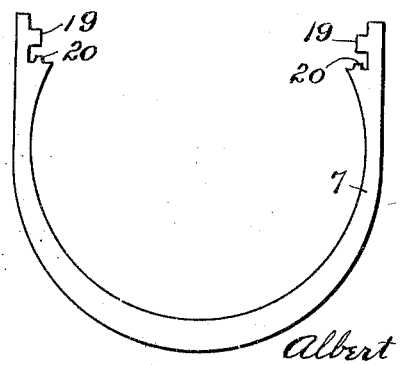
INVENTOR.
Albert Powelski
BY Warren W. House,
His ATTORNEY.
Witness:
R. E. Hamilton Oct. 15, 1929.  A. POWELSKI  1,731,907
JOURNAL BEARING
Filed July 6, 1926  4 Sheets-Sheet 4
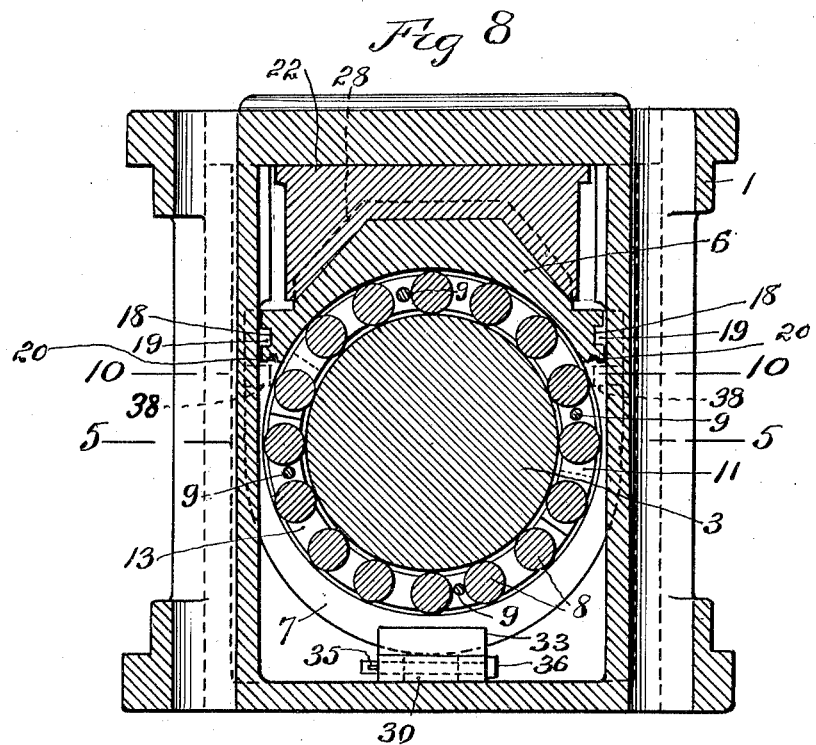
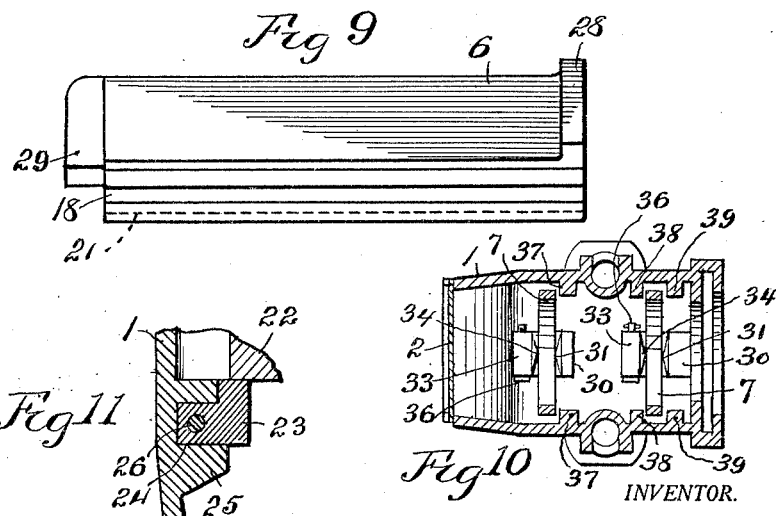
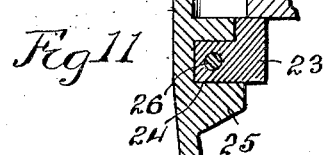
INVENTOR.
Albert Powelski
BY
Warren D. House.
His ATTORNEY
Witness:
R. E. Hamilton Patented Oct. 15, 1929

1,731,907

UNITED STATES PATENT OFFICE

ALBERT POWELSKI, OF KANSAS CITY, KANSAS

JOURNAL BEARING

Application filed July 6, 1926. Serial No. 120,700.

My invention relates to improvements in journal bearings.

It relates particularly to railway car journal boxes having roller bearings.

One of the objects of my invention is to provide a novel journal bearing, particularly well adapted for use in connection with journals having the usual peripheral grooves and end flanges, having novel upper and lower bearing members which co-operate with the journal to form a race for bearing rollers, which is adapted for application to the usual type of journal box with little modification thereof, which provides novel means for releasably locking the bearing members in their operative positions, and which permits of their ready removal or insertion.

My invention provides further novel means for releasably locking a supporting wedge in the box.

My invention provides still further a novel roller engaging cage particularly well adapted for use in connection with a journal having a peripheral bearing groove and end flange, the cage comprising two principal separable parts which adapt it for insertion and removal, the two parts having novel means for engaging with each other to retain them in their proper relative operative positions.

My invention provides further novel means for releasably retaining the lower bearing members in their operative positions in the box, while permitting them to tip laterally and to pivot on vertical axes, whereby a flexible connection between the box and journal is afforded.

My invention provides further a journal bearing which is simple, strong, durable, not liable to breakage or to get out of order, which is cheap to make, which permits of the easy insertion of new parts for those which become worn, and which is adaptable to standard equipment.

The novel features of my invention are hereinafter fully described and claimed.

In the accompanying drawings, which illustrate the preferred embodiment of my invention, Fig. 1 is a central vertical longitudinal sectional view of my improved journal bearing shown mounted on a journal and in a journal box of standard type.

Fig. 5 is a horizontal section on the line 5—5 of Fig. 8.

Fig. 6 is an outer end elevation of the upper bearing member.

Fig. 7 is an outer end elevation of one of the lower bearing members.

Fig. 8 is a cross section on the plane of the line 8—8 of Fig. 5.

Fig. 9 is a side elevation of the upper bearing member.

Fig. 10 is a reduced horizontal section of the box, other parts being omitted, taken on the plane of the line 10—10 of Fig. 8.

Fig. 11 is a cross section on the line 11—11 of Fig. 3.

Similar reference characters designate similar parts in the different views.

Figure 1:
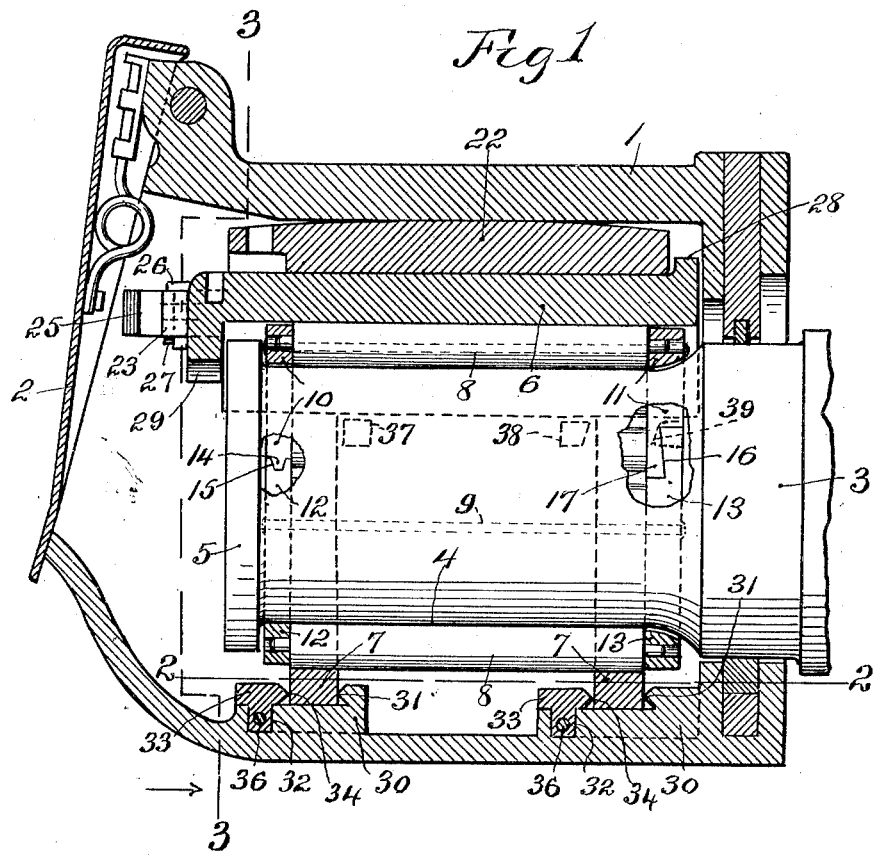

1 designates the journal box, which in general construction corresponds to a standard box in common use, having at its outer end the usual lid 2.

3 designates an ordinary car axle journal mounted in the box 1 and having the usual annular peripheral bearing groove 4 terminating at its outer end at the annular end flange 5.

Longitudinally slidable into and out of the box 1 is an arcuate bearing member 6, to which are removably attached the upper ends of two U shaped lower bearing members 7, which are alike in construction and function, and which are disposed in the box 1 one in front of the other. The inner sides of the bearing members 6 and 7 form a circle and are spaced from the grooved portion 4 of the journal, and are adapted to form therewith a race in which are mounted longitudinal bearing rollers 8, which have traveling contact with the members 6 and 7 and with the journal.

To retain the rollers 8 separated from each other, they may be mounted in a two part cage, each part comprising a unit insertible and removable independently of the other part.

Each of said parts of the cage comprises two half rings connected by longitudinal rods 9 and having rotatably mounted therein the ends of some of the rollers 8, the ends of the other rollers being rotatably mounted in the half rings of the other part of the cage. The outer and inner half rings of one part of the cage are respectively designated by 10 and 11, and the outer and inner half rings of the other part of the cage are respectively designated by 12 and 13.

Figure 3:
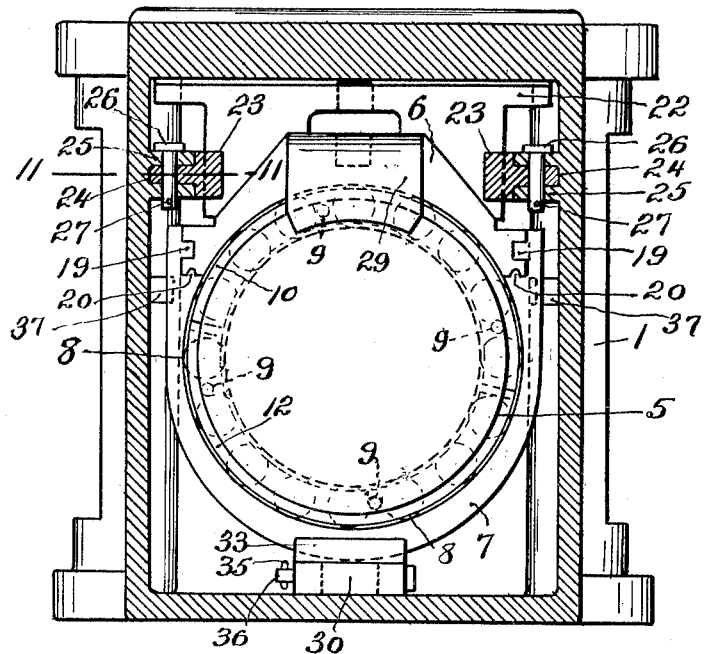
Fig. 3 is a cross section on the line 3—3 of Fig. 1.
Figure 4:
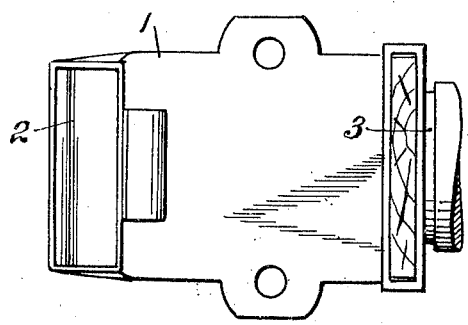
Fig. 4 is a reduced top view of the journal box and part of the journal.

To hold the two parts of the cage against relative longitudinal movement, the ends of the half rings 10 and 12 have a tongue and groove connection with each other, in which each end of the half ring 10 is provided with a tongue 14 fitted in a transverse groove 15 in the adjacent end of the half ring 12, Figs. 1 and 3.

To hold the two parts of the cage against relative radial movement from each other, the ends of the half rings 11 and 13 have a half-lap dovetail connection with each other, Figs. 1 and 3, in which the outer side of each end portion of the half ring 13 is provided with a recess 16 having a reentrant angle and in which is fitted a correspondingly shaped end portion 17 of the half ring 11.

To hold the lower bearing members 7 against lateral and vertical movement with respect to the upper bearing member 6, the latter is provided with longitudinal grooves 18 at opposite edge portions respectively, said grooves being preferably, as shown, in the outer edges of the member and facing laterally outwardly. Each member 7 is provided with two lateral inwardly extending projections 19 adapted to be respectively slidably fitted in the grooves 18, Fig. 6 and Fig. 7.

To hold the members 7 against lateral outward movement in case of breakage, each member 7 is provided with two upwardly extending projections 20 adapted to be slidably fitted respectively in two longitudinal grooves 21 which face downwardly in the bottom edges of the member 6. In case a member 7 should break into two parts, the projections 20 would hold the two pieces from lateral movement, and the projections 19 would still perform the function of holding the pieces from vertical movement.

Mounted on and supported by the bearing member 6, is a wedge 22 mounted in and supporting the box 1.

Releasable means for limiting the outward movement of the wedge 22 comprises two locking members 23, Figs. 1, 3 and 11, which are respectively removably fitted in two recesses 24 provided respectively in two lugs 25 on the inner side and forward portion of the box 1. Two vertical removable locking pins 26 extend respectively through the lugs 25 and the locking members 23. The lower ends of the pins 26, below the lugs 25, may have respectively fitted in them removable cotter pins 27.

For limiting the outward movement of the bearing member 6, it is provided on its upper side and at its rear or inner end with a peripheral flange 28 adapted to engage the inner end of the wedge 22, Fig. 1.

The outer end of the bearing member 6 is provided with a lip 29 which extends downwardly in front of and adapted to contact with the outer end of the journal 3 to limit the outward movement of the journal in the box 1.

To retain the bearing members 7 from forward movement and yet permit their pivotal movement on vertical axes and also an inner and outer tipping movement, the inner bottom side of the box 1 is provided centrally with two lugs 30, the outer or front sides of which are respectively provided with forwardly facing wedge portions 31 against which are adapted to respectively bear the inner sides of the members 7.

Figure 2:
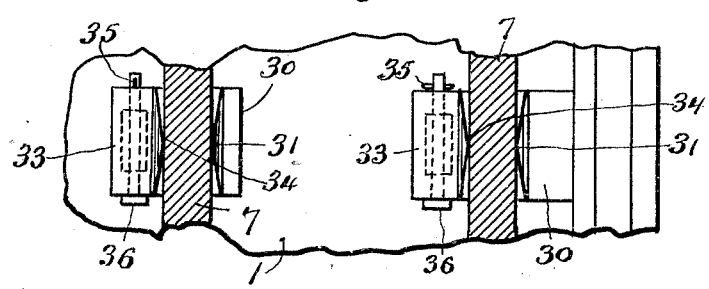
Fig. 2 is a fragmental sectional view on the line 2—2 of Fig. 1.

The lugs 30 are respectively provided with vertical holes 32 in which are respectively fitted two removable locking members 33, Figs. 1, 2 and 10, provided at their inner sides respectively with rearwardly facing wedge portions 34, disposed in longitudinal alinement with the wedge portions 31 and respectively bearing against the outer or front sides of the members 7. Cotter pins 35 may be removably fitted in the locking pins 36, which are respectively removably extended through the lugs 30 and the locking members 33.

Opposite inner sides of the box 1 are provided with two lugs 37 normally spaced from but adapted to contact with the inner side of the outer bearing member 7. The box at its inner sides is also provided with two oppositely disposed lugs 38 located at the rear of and spaced from the inner bearing member 7. Similarly positioned lugs 39 are provided in the box 1 forward of and spaced from but adapted to contact with the outer side of the inner member 7 to limit its pivotal movement. The inner member 7 being located between the lugs 38 and 39 is thereby held in an upright position, while the parts are being assembled.

In assembling the parts, the rear lower bearing member 7 is inserted between the lugs 38 and 39 and against the outer or wedge portion 31 of the inner lug 30. The inner locking member 33 is then mounted in said inner lug, after which the inner locking pin 36 is mounted in said inner lug and locking member, and the cotter pin 35 extended through this locking pin.

In like manner, the outer member 7 is mounted against the outer lug 30 and secured in place by the insertion in said lug of the locking member 33 intended for this position, after which the outer locking pin 36 is inserted through the outer lug 30 and adjacent locking member 33, and the front cotter pin 35 is mounted in said front locking pin 36.

The part of the cage having the half rings 12 and 13 is inserted into the box over the journal 3 after the box 1 has been slipped onto the journal and the latter being extended through the members 7. This part of the cage is then revolved around the journal to the under side thereof, as in Fig. 8, after which the other part of the cage is inserted over the journal, and the portions 17 thereof fitted into the recesses 16, the tongues 14 being fitted into the grooves 15. The tongues 14 hold the parts of the cage from longitudinal relative movement, and the overlapping dovetail portions 17 hold the parts from vertical relative movement.

The upper bearing member 6 is then slipped into the box so as to have its under side rest on the uppermost rollers 8.

The wedge 22 is then slipped into the box on top of the member 6, the box 1 being raised so as to permit of such insertion, after which the locking members 23 are fitted in the recesses 24 in the lugs 25. The locking pins 26 are then inserted through the lugs 25 and locking members 23, and the cotter pins 27 are fitted in the pins 26.

The parts will now be mounted in their operative positions in which positions they will be retained by the locking means described.

When the journal swings laterally or upwardly or downwardly in the box, as will occur in making turns in the track, the bearing members 6 and 7 will move correspondingly with the journal, as will the wedge 22, the pivotal mounting of the members 7, permitting them to take such movements.

As stated, the lip or flange 28 on the inner end of the member 6 holds the latter within certain longitudinal movement, and the lip 29 limits the outward movement of the journal in the box.

I do not limit my invention to the structure shown and described, as many modifications, within the scope of the appended claims, may be made without departing from the spirit of my invention.

What I claim is:—

1. In a journal bearing, upper and lower bearing members adapted to form with a journal a race for receiving bearing rollers, and having interlocking engagement with each other which permits relative longitudinal movement with respect to each other and which holds them from vertical and lateral movement with respect to each other.

2. In a journal bearing, an upper bearing member and a lower bearing member adapted to form a race for roller bearings, the upper bearing member having two lateral longitudinal grooves, and the lower bearing member having two lateral longitudinal flanges longitudinally slidable in said grooves respectively and by which the lower member is supported and held from relative transverse and vertical movement with respect to the upper bearing member.

3. In a journal bearing, an upper bearing member and a lower bearing member adapted to form a race for roller bearings, the upper bearing member having in opposite longitudinal edges respectively two longitudinal grooves facing laterally, and the lower bearing member having on its opposite inner sides respectively two longitudinal flanges respectively longitudinally slidable in said grooves.

4. In a journal bearing, an upper bearing member having on its outer side a lip adapted to engage a wedge and having at its outer end a lip adapted to engage the outer end of a journal, said member having two longitudinal lateral grooves, and a lower bearing member having two lateral flanges adapted to be respectively slidably fitted in said grooves, said members being adapted to form a race for bearing rollers.

5. In a journal bearing, an upper bearing member and a lower bearing member adapted to form between them a race for bearing rollers, the upper bearing member having two lateral longitudinal grooves and in its under side having two longitudinal downwardly facing grooves, the lower bearing member having a pair of longitudinal lateral flanges and a pair of longitudinal upwardly extending flanges respectively longitudinally slidable in said lateral and downwardly facing grooves.

6. In a journal bearing, a journal box having on its inner side a lug having a forwardly facing wedge shaped portion, a locking member releasably engaging said box and having a rearwardly facing wedge shaped portion in front of and longitudinally alining with said forwardly facing portion, and a lower bearing member adapted to support bearing rollers located and adapted for pivotal movement on a vertical axis between and bearing against said wedge shaped portions.

7. In a journal bearing, a journal box having on its inner lower side a lug having a forwardly facing wedge shaped portion, a locking member releasably engaging said box and having a rearwardly facing wedge shaped portion in front of and longitudinally alining with said forwardly facing wedge shaped portion, a locking pin removably insertible through said lug and said locking member, and a lower roller bearing member located and adapted for pivotal movement on a vertical axis between and bearing against said wedge shaped portions.

8. In a journal bearing, a journal box having on its inner lower side a lug having a forwardly facing wedge shaped portion, a locking member releasably engaging said box and having a rearwardly facing wedge shaped portion in front of and longitudinally alining with said forwardly facing wedge shaped portion, an upper bearing member, and a lower bearing member adapted to form with said upper bearing member a race for bearing rollers and having engagement with the upper member by which said members move conjointly, said lower bearing member being located and adapted for pivotal movement on a vertical axis between and bearing against said wedge shaped portions.

9. In a journal bearing, a journal box having on its inner lower side a lug having a forwardly facing wedge shaped portion, a locking member releasably engaging said box and having a rearwardly facing wedge shaped portion in front of and longitudinally alining with said forwardly facing wedge shaped portion, an upper bearing member having two longitudinal lateral grooves, and a lower bearing member adapted to form with said upper member a race for bearing rollers and having two longitudinal lateral flanges respectively slidably fitted in said grooves, and being located and adapted for pivotal movement on a vertical axis between and bearing against said wedge shaped portions.

10. In a journal bearing, a journal box, an upper bearing member in said box, a lower bearing member having engagement with said upper bearing member by which said members will move laterally conjointly and by which the lower member longitudinally slidably engages the upper member, and means engaging said box and the lower bearing member by which the latter is held from outward movement and permitted to swing on a vertical axis.

In testimony whereof I have signed my name to this specification.

ALBERT POWELSKI.